April 26, 1966 R. R. PRATT 3,247,882
SIDEWALL VALVE FOR TUBELESS TIRES
Filed May 20, 1964
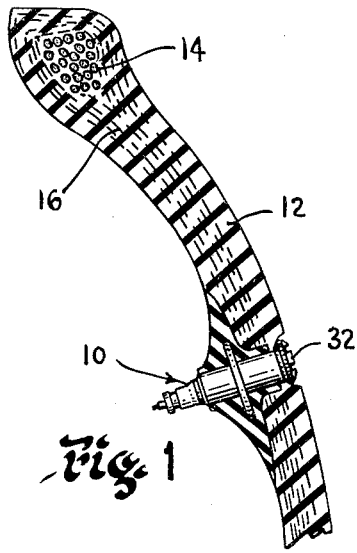
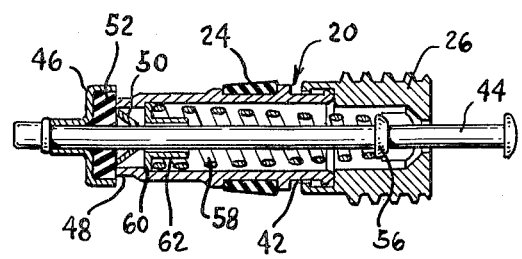
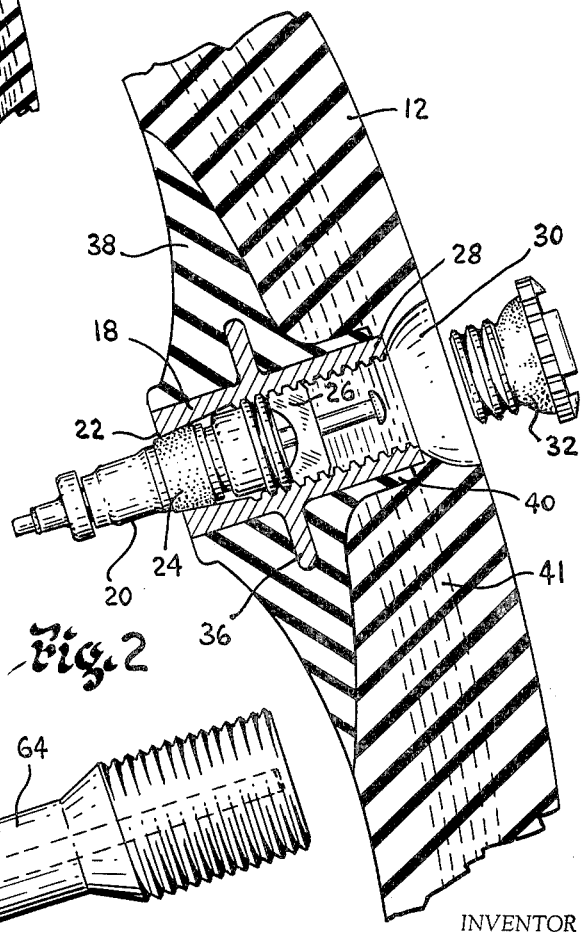
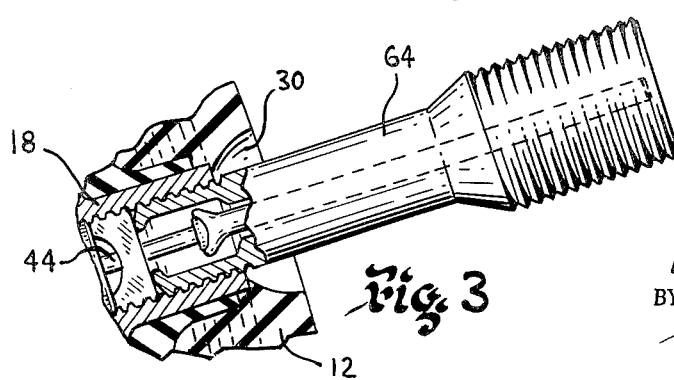
INVENTOR
ROBERT RICHARD PRATT
BY
Steward & Steward
his ATTORNEYS.

United States Patent Office 3,247,882
Patented Apr. 26, 1966

3,247,882
SIDEWALL VALVE FOR TUBELESS TIRES
Robert Richard Pratt, North Haven, Conn., assignor to
The Armstrong Rubber Company, West Haven, Conn.,
a corporation of Connecticut
Filed May 20, 1964, Ser. No. 368,838
4 Claims. (Cl. 152—429)

This invention relates to sidewall valves for tubeless tires, and it relates more particularly to such valves which employ a rigid metal stem firmly bonded into the tire sidewall with positive-seal valve cores, as distinct from the all-rubber needle-inflation type of valve commonly used for athletic equipment.

In certain tire installations it is not feasible to place a valve stem through the rim for the tire in the usual manner. For example, in aircraft landing gear, more particularly, equipment is frequently located near the hub of the wheel, making it difficult to obtain access to a valve stem in the rim. Or such equipment may allow so little clearance that a valve stem is likely to interfere with it. It is therefore desirable in such situations, and even essential in some cases, to provide the inflation valve in the sidewall of the tire and to make it flush with the outer surface of the tire so that it is completely clear of any nearby parts on the aircraft.

In light aircraft tires having relatively thin walls, the only sidewall valves that I know of actually in use prior to my invention have been the all-rubber type referred to above. These, however, are not entirely satisfactory because they leak under the extreme conditions of vibration and stress set up in the tire while rotating at high speed during take-offs and landings. Needle-inflation valves also leak at low temperatures and even when the aircraft rocks at its mooring in high winds.

On the other hand, while metal-stem sidewall valves have been developed in which positive air-seal valve cores are used in thin-walled tires, these have not been reliable for one reason or another, and to my knowledge have not been accepted for use on tires for small airplanes. Furthermore, it has not been commercially practical to use existing tire-making equipment for the manufacture of relatively thin-walled tires where the valve stem is bonded in place in the sidewall when the tire is vulcanized. This problem exists because the standard metal valve stems are so long that they project too far out from either or both surfaces of the tire. If the valve stem extends any distance at all above the outer surface of the tire, it is necessary to index the tire when it is molded so that the valve stem fits into a recess provided therefor in the mold. As any skilled tire manufacture knows, this is wholly impractical in the large-scale production of tires. On the other hand, if a conventional valve stem is located in the sidewall so that its outer end is flush or below the outer surface of the tire, then its inner end extends so far inwardly of the inner surface of the tire that it damages the tire molding equipment.

It is therefore an object of the present invention to provide a metal-stem, positive air-seal, inflating valve for tubeless tires capable of being integrally bonded by vulcanization into the sidewall of the tire at the time the tire is molded and cured in production molds widely used by tire manufacturers.

In order to provide a commercially acceptable sidewall valve, which is satisfactory in all respects, performance-wise as well as from a manufacturing standpoint, it is virtually essential to use spring-loaded valve cores of a standard type already in large-scale production, so that they can be supplied at the lowest cost but with absolute assurance that they will stand up under the severe conditions to which they will be subjected. One of the most difficult problems involved in the development of such a sidewall valve is the provision of a suitable valve stem in which the valve core may be supported in the sidewall of the tire itself.

In the conventional tire valve assembly, it is standard practice to completely encompass the core within the valve stem. However, this requires that the valve stem be relatively long, and such a valve stem cannot be cured in a thin-walled tire on a commercial scale for the reasons already mentioned. Furthermore, if the valve stem projects outwardly from the sidewall, it can interfere with the landing gear, in the case of aircraft tires, or it may cause serious damage to the tire if the tire scuffs against a curb or stone when in use.

Prior attempts to shorten the valve stem so as to overcome these difficulties have not been successful, because it has been felt that this necessarily involved completely redesigning the core so that it would fit the shorter valve stem. So far no valve core small enough to fit entirely within such a short valve stem has been satisfactory or practical from a service standpoint. This failure apparently is due to the fact that the usual positive-action closing spring for the valve has been either eliminated or so weakened in attempting to make a valve which will fit into a space equivalent to the thickness of the sidewall of a tire, that the valve so designed is not leakproof.

The present invention provides a simple solution to this problem in making it possible to reduce the length of the valve stem so that it does not extend too far inside the tire when recessed below the outer surface of the tire sidewall, while at the same time supports and positively seals a valve core of conventional size and of proven capability in preventing leakage. In accordance with the present invention, therefore, a valve stem, which is no more than ⅝ inch in length, is molded into the sidewall with one end recessed below the outer surface of the tire and with the other, or inner, end extending inwardly of the tire. A retaining flange on the periphery of the valve stem is located at least one-quarter of the length of the valve stem from its inner end, and the valve stem so positioned in the sidewall of the tire that the retaining flange is disposed close to the inner surface of the tire. The entire inwardly projecting portion of the valve stem is embedded in a laterally enlarged mounting base of rubber-like material which flares outwardly and blends smoothly into the inner surface of the tire in order to provide means by which said valve stem may be securely bonded to the sidewall. The valve stem is then molded into the tire sidewall in a conventional automatic tire mold so that the rubber mounting base or mushroom flange for the valve stem becomes an integral and inseparable part of the tire. It has been found that by limiting the amount by which the valve stem projects inwardly of the inner surface of the tire to a maximum of ½ inch, it is possible to mold the stem into the tire without damaging the inflation bag or bladder in the tire molding equipment.

A further feature of the invention resides in the provision of a sealing seat for the valve core at the innermost end of the valve stem and in permitting the core assembly, when it is mounted in the stem, to extend a substantial distance inwardly of the inner end of the stem into the interior of the tire. This makes it possible to use a valve core of any desired length. Moreover, it is standard practice to locate the sealing collar by which the valve core is sealed within the valve stem, adjacent the mounting threads at the outer end of the valve core. Thus, since the core assembly may extend inwardly of the inner end of the valve stem in the present valve assembly, a core of standard design can be employed, despite the fact that only a relatively short valve stem is provided. Although it is possible to use stock valve cores in the sidewall valves of the present invention, it has been found that more reliable results are obtained by providing a firm support for the valve pin within the valve core, in order to prevent vibration of the valve on its seat.

Many advantages flow directly from the present invention. Thus, it is believed that the present sidewall inflation valve is the first such construction to be capable of being molded in standard production molding equipment directly into the sidewall of thin-walled tires. Bonding of the valve stem in this manner ensures against air leaking around the stem. Moreover, by making it possible to recess the valve stem below the outer surface of the tire, it is also feasible to provide a valve cap which is recessed below the outer surface of the tire. Still other advantages of the invention will be apparent from the foregoing general description and from the specific disclosure hereinafter of one embodiment of the invention which is shown in the accompanying drawings.

In the drawings,

FIG. 1 is a fragmentary cross-sectional view of the bead portion and lower sidewall of a tire with an inflating valve in accordance with the invention shown mounted in the sidewall;

FIG. 2 is an enlarged view of the sidewall valve shown in FIG. 1, with the valve stem shown in longitudinal section exposing the valve core;

FIG. 3 is an enlarged fragmentary view of the outer end of the sidewall valve, showing the dust cap removed and an inflating extension threaded into the valve stem instead; and FIG. 4 is an enlarged central longitudinal sectional view through the valve core assembly.

As may be seen in FIG. 1 the valve assembly 10 of the present invention is located in the sidewall 12 of the tire adjacent the bead 14 and somewhat beyond the ends of the chafer strips 16 of the tire, so that it clears the rim of the wheel when the tire is mounted. The valve assembly 10 includes a metal sleeve 18 which, because it takes the place of the valve stem of an inner tube or of the rim-mounted valve stem for a conventional tubeless tire, is likewise referred to for the sake of convenience as a valve stem. The valve assembly 10 further includes a valve core 20 mounted at one end within valve stem 18.

At the inner end of the valve stem 18 is provided an internal seat 22, which is tapered inwardly toward the end of the valve stem, for sealing the core 20 within stem 18 so that air cannot leak by the valve core. A suitable, tough, resilient collar 24 on the periphery of core 20, tapered to fit the seat 22, provides a high-pressure seal between the valve core 20 and stem 18. Valve stem 18 is internally threaded from immediately adjacent the seat 22 at its inner end to its outer end 28, for the reception of the threaded head portion 26 of valve core 20. The collar 24 is located immediately adjacent the threaded end 26 of core 20 for sealing engagement with the tapered seat 22 when the valve core is threaded into the valve stem through the outer end and then turned down tight.

The outer end 28 of valve stem 18 is recessed below the outer surface of the tire sidewall 12 and opens into a cup-shaped depression 30 in the sidewall rubber of the tire. A dust cap 32 is threaded into the outer end of the valve stem in order to prevent dirt, dust and moisture from entering the valve assembly 10. It will be noted in FIG. 1 that when dust cap 32 is in place, it is completely recessed within the depression 30 so that nothing projects from the sidewall of the tire.

In order not to damage the curing bladder or bag in the conventional bag-type, or "Bag-o-matic," curing equipment used in molding and vulcanizing the tire, it is important to proportion the length of the valve stem so that it does not extend too far inwardly of the tire. It has been almost universally accepted by experts in the art that in order to employ the so-called short core of the type here contemplated, it is essential to make the valve stem at least 1.25 inches in length overall. Consequently in any tire having a sidewall thickness of less than ¾ inch, a valve stem of a length considered heretofore to be the bare minimum would project more than ½ inch from the inner surface of the tire if the outer end is recessed below the sidewall. It has been found, however, that where the valve stem extends more than ½ inch from the inner wall of the tire, it is not feasible to cure the tire with the valve stem in place due to the fact that the curing bladder or bag of the molding equipment will be damaged or the valve stem torn from its place in the sidewall of the tire.

In accordance with the present invention, since the valve stem 18 has a maximum overall length of ⅝ inch and is desirably on the order of ½ inch, it is practical to mold tires of minimum sidewall thickness with the valve stem in place.

It will be noted that when the valve core 20 is positioned in valve stem 18, its inner end projects substantially beyond the inner end of the valve stem. This makes it possible to use a much longer valve core than would be feasible if it were enclosed entirely within the valve stem, as had been the practice heretofore. Consequently a positive, spring-loaded valve of approved construction may be employed. Furthermore, since the core is not inserted into the valve stem until after the stem has been molded into the tire, the extra length required in the valve core is not a factor in curing the tire in automatic tire molds.

In order to assure against blow-outs through the sidewall at the inflation valve, a rigid retaining flange 36 is integrally formed in the periphery of the valve stem 18 at least one-fourth the length of the valve stem from its inner end. The exact position of the retaining flange 36 depends upon how much the valve stem extends inwardly of the sidewall, and should be so arranged that when the valve stem is located in the desired position transversely of the sidewall, flange 36 will be in close proximity to the inner surface of the tire. In the particular arrangement shown in FIG. 2, flange 36 is located somewhat more than a third of the length of the valve stem 18 from its inner end.

The entire section of valve 18 extending inwardly of sidewall 12 is embedded in a rubber-like mass of material which forms a mushroom-shaped base flange 38. As shown in FIGS. 1 and 2, the cross hatching for the mushroom 38 is different from that of the sidewall of the tire simply to show the approximate relationship of the material after the tire has been cured. It will be appreciated, however, that upon curing the tire in the mold, the base 38 becomes an integral part of the sidewall of the tire. It will also be noted from the drawing that due to the internal pressure exerted on the valve stem and its mushroom-shaped base 38 while the tire is in the mold, the inner liner of the tire is squeezed away from the valve stem, helping to blend the base 38 and wall of the tire into a smooth, gradually curved inner surface. The base 38, moreover, extends radially a substantial distance from the valve stem so as to provide a firm bond between the sidewall and valve stem. In order to prevent so-called "flex-hinge" points, base 38 is gradually reduced in thickness toward its periphery. The inner surface of the tire is thus only slightly raised by the addition of valve stem 18, which presents no sharp protuberances to pierce or otherwise damage the inflating bag or bladder in the molding operation. It also disposes the greatest volume of rubber around the retaining flange 36, thereby solidly embedding the valve stem in the tire.

In order to still further assure against air leaking around the valve stem, a sleeve 40 of rubber extends outwardly from the base 38 around the outer section of the valve stem where it passes through the cords 41 of the tire. Valve stem 18 is desirably inserted between the individual fibers of cords 41 of the tire, without severing them, in order not to weaken the sidewall.

The valve core 20 shown in detail in FIG. 4 has an enlarged hollow body 42, which is open at both ends and which supports a valve pin 44 for longitudinal movement within it. Pin 44 extends outwardly from both ends of the valve body 42 and mounts a valve head 46 at one end externally of the valve body. The rear side of the valve head 46 is drawn by pin 44 into engagement with a valve seat 48 at the inner end of valve body 42. A conically shaped retaining grommet 50 on the rear side of valve head 46 holds a resilient sealing washer 52 in the face of the valve, and at the same time, serves to align the valve head 46 with valve seat 48 as it is drawn within the opening at the inner end of the valve body.

At the outer end of valve body 42, valve pin 44 is loosely supported by the threaded head portion 26. A fixed annular stop-shoulder 56 is provided on pin 44 adjacent to the outer end thereof, but within the portion 26. A coil spring 58 engages stop-shoulder 56, urging pin 44 and valve head 46 into valve-closing position. The opposite end of spring 58 rests against the base 60 of a guide bushing 62, through which the valve pin 44 fits. Guide bushing 62 keeps the valve head 46 centered so that it does not tilt or vibrate on its seat 48 under the severe forces acting transversely thereof. Although not readily apparent from FIG. 4 sufficient clearance is provided between pin 44 and guide bushing 62 to permit the passage of air through the valve body.

A major portion of the passage valve body 42 is of a uniform diameter, but a short section provided adjacent the valve seat 48 is of a slightly smaller diameter to form an annular shoulder, against which base 60 of guide bushing 62 is rigidly pressed by coil spring 58. Thus, coil spring 58 acts not only to close valve 46, but also to retain guide bushing 62.

The outer end of valve pin 44 extends outwardly from the valve core 20 for engagement by conventional inflating or deflating equipment, such as the inflating extension 64 shown in FIG. 3 which may be conveniently used in connection with the present sidewall valve.

What is claimed is:

1. A tire inflating valve comprising an elongated hollow valve body having a central longitudinal axis and an opening at each end thereof, one of said ends forming a valve seat, a valve pin mounted axially within said valve body for longitudinal movement relative thereto and extending outwardly of said valve seat, a valve head supported on said valve pin adjacent said valve seat and externally of said valve body for movement with said valve pin into and out of closing engagement with said valve seat, a guide bushing rigidly mounted within said valve body adjacent said valve seat and having a bore disposed axially of said valve body through which said valve pin fits, such that said valve pin and valve head are supported adjacent said valve seat against forces acting transversely thereof, and spring means mounted between said valve body and valve pin urging said valve head into closing engagement with said valve seat, said guide bushing being fixed against movement longitudinally of said valve body by an internal shoulder portion of said valve body, against which it is urged, said spring means engaging said guide bushing and pressing it into rigid engagement with said shoulder portion.

2. An inflating valve for a tubeless tire having a sidewall, said valve comprising a rigid valve stem having a passage extending longitudinally thereof, and an elongated spring-loaded valve core threadedly mounted in said passage, an internal valve-core sealing seat at the inner end of the passage in said valve stem, said valve stem being internally threaded from said sealing seat to its outer end and said valve core having an externally threaded portion at its outer end for threaded engagement within said valve stem and having a peripheral seal adjacent and inwardly of said threaded portion for engagement with said sealing seat, said valve core extending inwardly of the inner end of said valve stem when said peripheral seal of said valve core engages said sealing seat in said valve stem, said valve stem being disposed perpendicularly through said sidewall with its inner end opening into the interior of the tire and its outer end exposed to the exterior of the tire but recessed below the outer surface of the tire, said valve stem extending no more than one-half inch inwardly of the inner surface of said tire and having a laterally enlarged retaining flange disposed adjacent the inner surface of the tire and embedded in a mushroom-shaped mounting base of rubber-like material, said valve stem and mounting base being integrally molded and bonded with said sidewall.

3. A tubeless tire inflating valve as defined in claim 2, wherein the outer surface of the sidewall of the tire is provided with a depression surrounding the outer end of the valve stem, said inflating valve being provided with a cap threadedly engageable within the outer end of said valve stem, said cap being substantially flush with the outer surface of said sidewall when threaded tightly into said valve stem.

4. A tubeless tire inflating valve as defined in claim 2, wherein said valve core comprises a hollow valve body open at each end, one of said ends forming a valve seat, a valve pin extending through said body from end to end and movable longitudinally therein, a valve head supported on said valve pin for engagement with said valve seat, a guide bushing rigidly mounted within said valve body adjacent said valve seat and having a bore through which said valve pin fits, said valve pin and valve head being supported by said guide bushing against forces acting transversely thereof, and spring means disposed between said valve body and said valve pin urging said valve into seating engagement with said valve seat.

References Cited by the Examiner

UNITED STATES PATENTS

| | | | |
|---|---|---|---|
| 1,570,157 | 1/1926 | Knepper | 152—429 X |
| 2,116,087 | 5/1938 | Wahl | 137—234.5 |
| 2,191,025 | 2/1940 | Mitchell | 264—271 |
| 2,296,453 | 9/1942 | Saffert | 264—271 |
| 2,933,119 | 4/1960 | Siedow | 152—429 |
| 2,971,526 | 2/1961 | Boyer et al. | 152—429 X |
| 3,097,682 | 7/1963 | Harkins | 152—429 |

ARTHUR L. LA POINT, *Primary Examiner.*

C. W. HAEFELE, *Assistant Examiner.*